US012619954B2

(12) United States Patent
Morin

(10) Patent No.: US 12,619,954 B2
(45) Date of Patent: *May 5, 2026

(54) SYSTEMS AND METHODS TO GENERATE RECORDS WITHIN A COLLABORATION ENVIRONMENT BASED ON A MACHINE LEARNING MODEL TRAINED FROM A TEXT CORPUS

(71) Applicant: Asana, Inc., San Francisco, CA (US)

(72) Inventor: Steve B. Morin, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/784,435

(22) Filed: Jul. 25, 2024

(65) Prior Publication Data

US 2024/0378560 A1 Nov. 14, 2024

Related U.S. Application Data

(63) Continuation of application No. 17/674,437, filed on Feb. 17, 2022, now Pat. No. 12,118,514.

(51) Int. Cl.
*G06Q 10/10* (2023.01)
*G06F 40/30* (2020.01)
(Continued)

(52) U.S. Cl.
CPC ........... *G06Q 10/103* (2013.01); *G06F 40/30* (2020.01); *G06Q 10/06311* (2013.01); *G06N 20/00* (2019.01)

(58) Field of Classification Search
CPC .......... G06N 3/08; G06N 20/00; G10L 15/22; G10L 15/063; G10L 2015/223;
(Continued)

(56) References Cited

U.S. PATENT DOCUMENTS 5,826,252 A 10/1998 Wolters, Jr.
7,606,444 B1 10/2009 Erol
(Continued)

OTHER PUBLICATIONS

K. Miao, O. Biermann, Z. Miao, S. Leung, J. Wang and K. Gai, "Integrated Parallel System for Audio Conferencing Voice Transcription and Speaker Identification," 2020, 2020 International Conference on High Performance Big Data and Intelligent Systems (HPBD&IS) pp. 1-8, (Year: 2020).*
(Continued)

*Primary Examiner* — Sarah M Monfeldt
*Assistant Examiner* — Michael J. Monaghan
(74) *Attorney, Agent, or Firm* — Esplin & Associates, PC

(57) ABSTRACT

Systems and methods to generate records within a collaboration environment are described herein. Exemplary implementations may perform one or more of: manage environment state information maintaining a collaboration environment; effectuate presentation of a user interface through which users upload digital assets representing recorded audio and/or video content; obtain input information defining the digital assets input via the user interface; generate transcription information characterizing the recorded audio and/or video content of the digital assets; provide the transcription information as input into a trained machine-learning model; obtain the output from the trained machine-learning model, the output defining one or more new records based on the transcripts; and/or other operations.

20 Claims, 5 Drawing Sheets

(51) Int. Cl.
    *G06N 20/00*       (2019.01)
    *G06Q 10/0631*    (2023.01)
(58) Field of Classification Search
    CPC ......... G10L 15/16; G10L 15/26; G10L 15/02;
    G10L 15/1822; G10L 25/30; G10L
    15/1815; G10L 17/04; G10L 15/00; G10L
    15/18; G10L 15/08; G06Q 10/06311;
    G06Q 10/063112; G06Q 10/06316; G06Q
    10/06; G06Q 10/1097; G06Q 10/06315;
    G06Q 10/10; G06Q 10/0633; G06Q
    10/063118; G06Q 10/20; G06Q
    10/06312; G06Q 10/107; G06Q 10/1093;
    G06Q 10/103; G06F 40/30; G06F
    16/3329; G06F 18/214; G06F 16/23;
    G06F 40/40; G06F 40/35; G06F 16/3344;
    G06F 16/90332; G06F 40/20; G06F
    40/205
    See application file for complete search history.

(56)           References Cited

U.S. PATENT DOCUMENTS

| | | | |
|---|---|---|---|
| 10,748,529 B1 | 8/2020 | Milden | |
| 11,024,304 B1 | 6/2021 | Smith | |
| 11,095,468 B1* | 8/2021 | Pandey | H04L 12/1831 |
| 11,449,836 B1 | 9/2022 | Clifton | |
| 11,676,107 B1 | 6/2023 | Beauchamp | |
| 11,874,924 B2 | 1/2024 | Chen | |
| 11,874,942 B1 | 1/2024 | Surazski | |
| 12,141,756 B1 | 11/2024 | Beauchamp | |
| 12,218,992 B2 | 2/2025 | Johnson | |
| 2009/0222277 A1 | 9/2009 | Malek | |
| 2014/0304665 A1 | 10/2014 | Holz | |
| 2016/0239259 A1 | 8/2016 | Lenchner | |
| 2018/0027006 A1 | 1/2018 | Zimmermann | |
| 2018/0067991 A1 | 3/2018 | Agarwal | |
| 2018/0211223 A1* | 7/2018 | Jacobson | G10L 15/26 |
| 2019/0035386 A1 | 1/2019 | Leeb | |
| 2019/0129973 A1 | 5/2019 | Truong | |
| 2019/0327103 A1* | 10/2019 | Niekrasz | G10L 15/26 |
| 2020/0151566 A1 | 5/2020 | Mars | |
| 2020/0293618 A1 | 9/2020 | Chhabra | |
| 2020/0311122 A1 | 10/2020 | Ramamurthy | |
| 2021/0004436 A1 | 1/2021 | Jauhar | |
| 2021/0157978 A1 | 5/2021 | Haramati | |
| 2021/0375289 A1* | 12/2021 | Zhu | G06F 40/253 |
| 2021/0383127 A1 | 12/2021 | Kikin-Gil | |
| 2022/0206673 A1 | 6/2022 | Zhan | |
| 2022/0207392 A1* | 6/2022 | Hou | G06N 20/20 |
| 2022/0301557 A1* | 9/2022 | Braganza | G06F 40/30 |
| 2023/0071838 A1 | 3/2023 | Hood | |
| 2023/0073552 A1 | 3/2023 | Hamze | |
| 2023/0094828 A1 | 3/2023 | Ramsl | |
| 2023/0419651 A1 | 12/2023 | Crook | |
| 2024/0028564 A1 | 1/2024 | Davies | |
| 2024/0029027 A1 | 1/2024 | Morin | |
| 2024/0086803 A1 | 3/2024 | Lopez | |
| 2024/0112008 A1 | 4/2024 | Malik | |
| 2024/0134687 A1 | 4/2024 | Mouaddib | |
| 2024/0223728 A1 | 7/2024 | Morin | |
| 2024/0296399 A1 | 9/2024 | Garg | |
| 2024/0346449 A1 | 10/2024 | Beauchamp | |
| 2024/0428195 A1 | 12/2024 | Hood | |

OTHER PUBLICATIONS

Y. Shi, C. Bryan, S. Bhamidipati, Y. Zhao, Y. Zhang and K.-L. Ma, "MeetingVis: Visual Narratives to Assist in Recalling Meeting Context and Content," 2018, IEEE Transactions on Visualization and Computer Graphics, vol. 24, No. 6, pp. 1918-1929, (Year: 2018).*

An innovative way for document and work item management in agile development process; May 10, 2013; IP.com; IPCOM000227667D. 5 pages.

Ionescu, Bogdan, et al. "A chat-centric collaborative environment for web-based real-time collaboration." 2015 IEEE 10th jubilee international symposium on applied computational intelligence and informatics. IEEE, 2015. (Year: 2015).

Geyer, Werner, Heather Richter, and Gregory D. Abowd. "Making multimedia meeting records more meaningful." 2003 International Conference on Multimedia and Expo. ICME'03. Proceedings (Cat. No. 03TH8698). vol. 2. IEEE, 2003. (Year: 2003).

Dourish, Paul, and Victoria Bellotti. "Awareness and coordination in shared workspaces." Proceedings of the 1992 ACM conference on Computer-supported cooperative work. 1992.

* cited by examiner

200

Start

Manage Environment State Information Maintaining Collaboration Environment — 202

Effectuate Presentation Of User Interface — 204

Obtain Input Information — 206

Generate Transcription Information — 208

Generate Individual Records — 210

Finish

SYSTEMS AND METHODS TO GENERATE RECORDS WITHIN A COLLABORATION ENVIRONMENT BASED ON A MACHINE LEARNING MODEL TRAINED FROM A TEXT CORPUS

FIELD OF THE DISCLOSURE

The present disclosure relates to systems and methods to generate records within a collaboration environment, in particular using a machine learning model trained from a text corpus that generates records from asynchronously recorded audio and/or video content.

BACKGROUND

Web-based collaboration environments, sometimes referred to as work management platforms, may enable users to assign projects, tasks, or other assignments to assignees (e.g., other users) to complete. A collaboration environment may comprise an environment in which individual users and/or a virtual team of users does its work and enables the users to work in a more organized and efficient manner when remotely located from each other.

SUMMARY

Hosting a web-based collaboration environment poses many challenges. For example, operating the collaboration environment may require precise ways of creation, storage, management, and/or provision of information that makes up the collaboration environment. One way that operators look to improve the operation of the collaboration environment is to improve parts of the collaboration environment involving substantial human-machine interaction. For example, users may traditionally manually generate work unit records for units of work within the collaboration environment. The operators of the collaboration environment were traditionally tasked with finding ways to design and configure user interfaces which would provide user-friendly and intuitive ways to receive this manual input. However, even with improved user interfaces that walk through manual generation of work unit records, the requirement for human-machine interactions is time consuming, may cause decreased workflow efficiency, and/or may be prone to user error. The inventors of the present disclosure have also identified that work unit records are often created by the users from some reference material. For example, after a recorded video or audio meeting or dictation, a user may generate one or more work unit records that reflect the work to be done following the recording. This translation from one format (recorded audio/video) to manually providing precise definitions of information that makes up the collaboration environment further compounds these existing problems.

To address these and/or other problems, one or more implementations presented herein propose a technique to automatically generate records from a recording of audio and/or video. The audio and/or video may have been recorded asynchronously with respect to the creation of one or more records. The recorded audio and/or video may be referred to as "asynchronous audio and/or video." The records may be automatically generated from digital assets the user uploads which represent the asynchronous audio and/or video. By way of non-limiting illustration, a user may upload a digital asset (e.g., video files, audio file, and/or other assets) into a user interface. The system may carry out one or more processing techniques to extract the content from the digital assets, and structure the content into a format that facilitates creation of a record, such as a work unit record. By way of non-limiting illustration, the content may be parsed to identify values of parameters that make up a work unit record. In some implementations, when a work unit record is generated, one or more fields may be automatically filled based on context surrounding the uploaded asset(s).

In some implementations, a text corpus may be utilized as training data for a machine-learning model which performs the extraction and/or structuring of the content. In some implementations, the text corpus may comprise text that makes up one or more existing work unit records (and/or other records) present in the collaboration environment. These along with other features and/or functionality presented herein, may be recognized by persons of ordinary skill in the art as providing improvements upon the operation of a collaboration environment including, among others, increased efficiency and accuracy in the creation and management of the information making up records of the collaboration environment.

One or more implementations of a system to generate records within a collaboration environment may include one or more hardware processors configured by machine-readable instructions and/or other components. Executing the machine-readable instructions may cause the one or more hardware processors to facilitate generating records within a collaboration environment. The machine-readable instructions may include one or more computer program components. The one or more computer program components may include one or more of an environment state component, a user interface component, a content component, a work creation component, and/or other components.

The environment state component may be configured to manage environment state information maintaining a collaboration environment. The collaboration environment may be configured to facilitate interaction by users with the collaboration environment. The environment state information may include one or more records. The one or more records may include work unit records, project records, objective records, and/or other records. The work unit records may include work information and/or other information. The work information may characterize units of work created, managed, and/or assigned to within the collaboration environment to the users who are expected to accomplish one or more actions to complete the units of work. The work information may comprise values of work unit parameters characterizing the units of work.

The user interface component may be configured to effectuate presentation of a user interface through which users upload digital assets representing recorded content, e.g., video and/or audio content. The video and/or audio content may include human utterances and/or other content. The user interface may include one or more portions. The one or more portions may include an input portion. The input portion may be configured to receive user input of individual ones of the digital assets.

The user interface component may be configured to obtain input information defining the digital assets input via the user interface. The input information may define a first digital asset input into the user interface via the input portion. The first digital asset includes first recorded audio and/or video content including a first set of utterances.

In some implementations, the content component may be configured to, in response to obtaining the input information, generate transcription information and/or other information.

The transcription information may characterize the audio and/or video content. The transcription information may include transcripts and/or other information. The transcripts may include text strings characterizing one or more of the utterances, physical gestures, facial expressions, physical movement, and/or other content. By way of non-limiting illustration, first transcription information may be generated from the first recorded audio and/or video content of the first digital asset. The first transcription information may include a first transcript comprising a first set of text strings characterizing the first set of utterances and/or other content.

The work creation component may be configured to generate individual records. The work creation component may be configured to provide the transcription information as input into a trained machine-learning model. The trained machine-learning model may be configured to provide output based on input(s). The output may include new ones of the records. By way of non-limiting illustration, the input into the trained machine-learning model may include the first transcription information.

The work creation component may be configured to obtain the output from the trained machine-learning model. The output may include definitions of the new ones of the records based on the transcripts and/or other content. The output may define the new ones of the records by including one or more values of one or more parameters of the new ones of the records. By way of non-limiting illustration, the output may include a first work unit record based on the input of the first transcription information.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
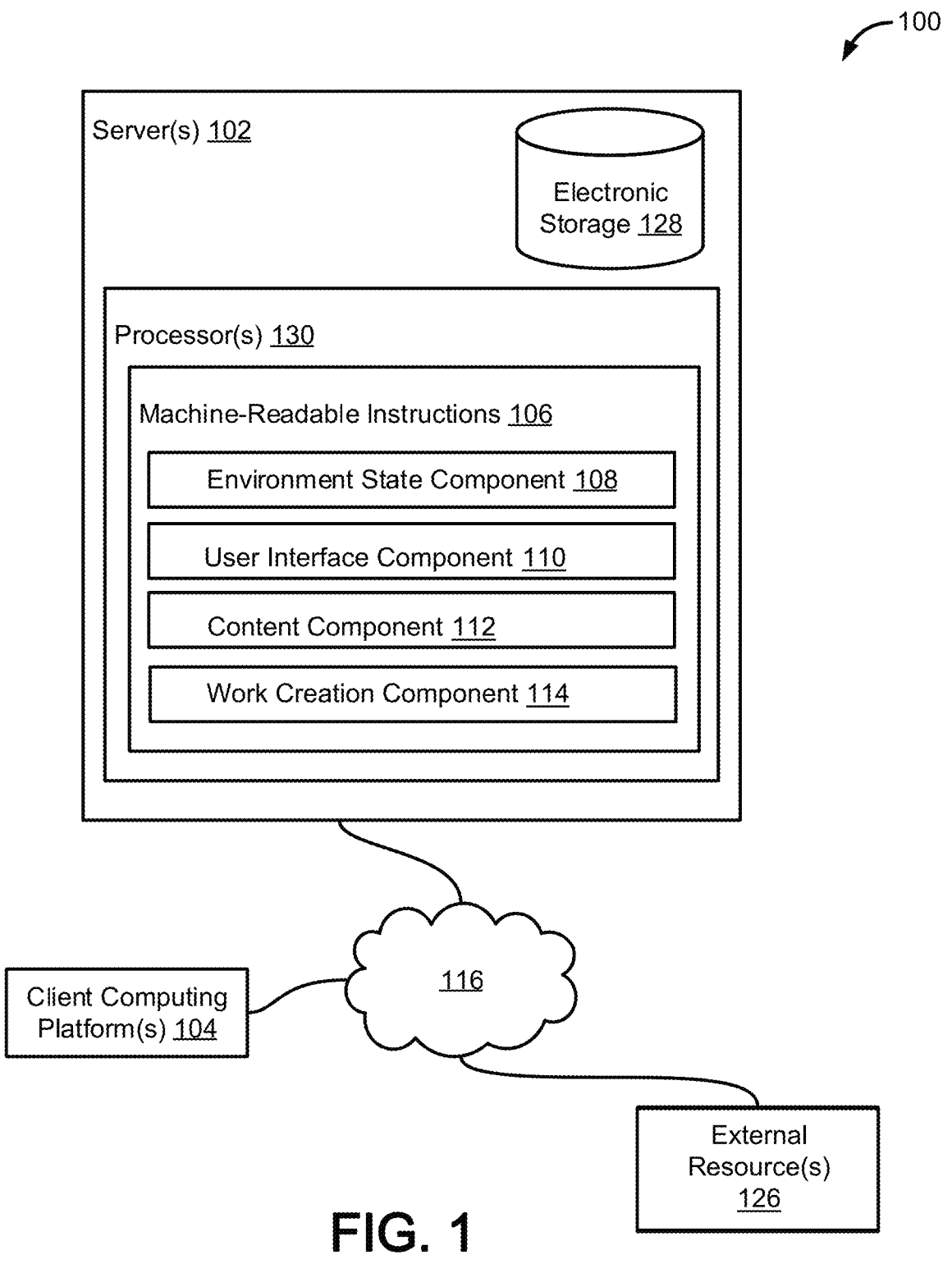
FIG. 1 illustrates a system configured to generate records within a collaboration environment, in accordance with one or more implementations.

FIG. 1 illustrates a system 100 configured to generate records within a collaboration environment, in accordance with one or more implementations. Often, records may be manually created by users from some reference material. For example, after a recorded video or audio meeting or dictation, a user may generate one or more records that reflect real work to be done following the recording. Manually generating records may be time consuming, may decrease workflow efficiency, and the detailed requirements for creation of the records in the collaboration environment may be affected by user error.

To address these and/or other problems, one or more implementations presented herein propose a technique to automatically generate records from a recording of audio and/or video. The audio and/or video may have been recorded asynchronously with respect to the creation of one or more work unit records (and may be referred to as "asynchronous audio and/or video"). In some implementations, the system 100 may utilize a text corpus as training data for a machine-learning model to perform extraction of content from the recordings and/or structuring of the content into a structure that facilitates the generation of records. In some implementations, the text corpus may comprise text that makes up one or more existing work unit records (and/or other records) present in the collaboration environment.

In some implementations, system 100 may include one or more of one or more servers 102, one or more client computing platforms 104, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Client computing platform(s) 104 may be remote from each other.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate generating records within a collaboration environment. The computer program components may include one or more of an environment state component 108, user interface component 110, a content component 112, work creation component 114, and/or other components.

Environment state component 108 may be configured to manage environment state information and/or other information used in maintaining a collaboration environment. The collaboration environment may be configured to facilitate interaction by users with the collaboration environment. The environment state information may include one or more records. The one or more records may include one or more of user records, work unit records, project records, objective records, and/or other records. The user records may include user information describing the users of the collaboration environment. The work unit records which may include work information describing units of work assigned to, created by, and/or managed by the users within the collaboration environment. The project records may include project information describing projects created, assigned, and/or managed within the collaboration environment. An individual project may include individual sets of the units of work supporting the individual projects. The objective records may include objective information describing business objectives specified within the collaboration environment.

The user information in the user records may include values of user parameters and/or other information. The values of the user parameters may be organized in the user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., user-name/password for one or more third-party applications), one or more favorites and/or priorities, schedule information, and/or other information.

Schedule information for the individual users may include one or more calendar entries associated with the individual users. The individual calendar entries may be associated with individual start dates and individual end dates. In some implementations, schedule information may be stored locally within electronic storage 128 by virtue of features and/or functionality provided within a collaboration environment. By way of non-limiting illustration, a collaboration environment may have features and/or functionality of a calendar application configured to facilitate calendaring entries into a schedule. It is noted that schedule information may be determined through features and/or functionality provided by one or more external resources 126. By way of non-limiting illustration, and external resource may include a calendar application which may be external to a collaboration environment. The collaboration environment may have permissions to access the external calendar application to determine and/or obtain schedule information.

The work information in the work unit records may include values of one or more work unit parameters. The values of the work unit parameters may be organized in work unit records corresponding to units of work managed, created, and/or assigned within the collaboration environment. A given unit of work may have one or more assignees and/or collaborators working on the given work unit. Units of work may include one or more to-do items, action items, objectives, and/or other units of work one or more users should accomplish and/or plan on accomplishing. Units of work may be created by a given user for the given user and/or created by the given user and assigned to one or more other users. Individual units of work may include one or more of an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access (or restricted from marking complete) by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, the one or more work unit parameters may include one or more of a work assignment parameter, work completion parameter, a work management parameter, work creation parameter, dependency parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information.

In some implementations, values of a dependency parameter may describe whether a given unit of work is dependent on one or more other units of work. A unit of work being dependent on an other unit of work may mean the unit of work may not be completed, started, assigned, and/or have other interactions performed in relation to the unit of work before some action is performed on the other unit of work. By way of non-limiting illustration, a unit of work may not be started until another unit of work is completed, meaning the unit of work may be dependent on the other unit of work. In some implementations, values of the dependency parameter may go hand in hand with the hierarchical information. By way of non-limiting illustration, a unit of work that is subordinate to an other unit of work may be dependent on the other unit of work, or vice versa.

In some implementations, values of work unit parameters may include one or more of a unit of work name, a unit of work description, user role information, one or more unit of work dates (e.g., a start date, a due date or end date, a completion date, and/or dates), project inclusion (e.g., identification of projects supported by the individual units of work), one or more members associated with a unit of work (e.g., an owner, one or more collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, dependency, one or more custom fields (e.g., priority, cost, stage, and/or other custom fields), and/or other information.

The values of the work assignment parameter describing assignment of users to units of work may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

Project information in project records may define values of project parameters for projects managed within the collaboration environment. The project parameters may characterize one or more projects created, assigned, and/or managed within the collaboration environment and/or via the collaboration environment, and/or the metadata associated with the one or more projects. Individual ones of the projects may be associated with individual ones of the project records. The project information may define values of the project parameters associated with a given project managed within the collaboration environment and/or via the collaboration environment. A given project may have one or more owners and/or one or more collaborators working on the given project. The given project may include one or more units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client and the units of work under the individual project heading may be work directly contributing to the fulfillment of a business relationship with the client.

The values of the project parameters may, by way of non-limiting example, include one or more of: one or more units of work within individual ones of the projects (which may include values of work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, projects created by, assigned to, and/or completed by the users may refer generally to a linking of the projects with the individual users in the collaboration environment. A project may be linked with a user in a manner that defines one or more relationships between the user and the project. Such a relationship may connote and/or be a result of an action (past, present, and/or future) of the user with respect to the project. Such actions may include one or more of creating a project record for a project, being assigned to participate in a project, participating in a project, being granted access to a project record of a project, adjusting a value of a project parameter of a project record of a project, being assigned a project-level role, and/or other actions.

User role information may specify individual roles of the individual users. A role may represent a position of an individual user. The position may be specified based on a description of one or more of a job title, level, stage, and/or other descriptions of position. The role may be specified with respect to a business organization as a whole and/or other specifications. By way of non-limiting illustration, a role may include one or more of chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within the units of work and/or the projects. The roles may convey expected contribution of the users in completing and/or supporting the units of work and/or the projects. The individual roles of individual users within the units of work may be specified separately from the individual roles of the individual users within the projects. The individual roles of individual users within the units of work and/or projects may be specified separately from the individual roles of the individual users within a business organization as a whole.

The objective information in objective records may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work and/or projects one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

The business objectives may be associated with a set of units of work and/or projects that may indirectly facilitate progress toward fulfillment of the business objectives. The set of units of work and/or projects may not directly contribute to the progress. By way of non-limiting illustration, a connection between the set of units of work and/or projects and a corresponding business objective may be indirect in that completion of at least one of the units of work and/or projects may have no direct impact on progress toward fulfillment of the business objective. The concept of "no direct impact" may mean that completion of the at least one unit of work and/or project may not cause progress toward fulfillment of the business objective without independent action outside of the at least one unit of work and/or project. Instead, the fulfillment of the at least one unit of work and/or project may make such independent action more likely (e.g., through coercion, assistance, education, incentivization, reminder, etc.). However, in some implementations, business objectives may be associated with a set of units of work and/or projects that may directly facilitate progress toward fulfillment of the business objectives. Accordingly, completion of the set of units of work and/or projects may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with a set of units of work and/or projects that may indirectly (and/or directly) facilitate progress toward fulfillment of the user objectives. User objectives may be specified on an individual user basis.

Individual objective records may describe individual business objectives and/or identify sets of work unit records and/or project records that support the individual business objectives.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record.

An objective record may define a business objective comprising a progress towards fulfillment, and a subordinate objective record may define a business objective comprising a subordinate progress towards fulfillment to the subordinate business objective. An objective record hierarchy may define a relationship between objective records.

Individual objective records may include hierarchical information defining an objective record hierarchy of the individual objective records. The hierarchical information of an objective record may include one or more of information identifying other objective records associated in an objective record hierarchy the objective record belongs to, a specification of the position of the objective record in the hierarchy, other relationships placed on the objective record by virtue of its position, and/or other information.

In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe business objectives assigned to be owned by an individual user. The values of the objective management parameter may describe business objectives managed as collaborators by the individual users. The values of the objective creation parameter may describe business objectives created by the individual users.

In some implementations, the business objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing business objectives owned by the individual users may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

Progress information for the individual business objectives may convey progress toward fulfillment of the individual business objectives. The progress information for the individual business objectives may convey progress toward fulfillment of the individual business objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual business objectives may be determined independently from incremental completion of the units of work in the individual sets of units of work associated with the individual business objectives. The completion of the units of work associated with a given business objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

It is noted that metadata and/or values of parameters related to any users, projects, business objectives, and/or units of work may be considered values of user parameters, project parameters, objective parameters, and/or work unit parameters.

In some implementations, environment state component 108 may be configured to manage information defining work unit pages corresponding to the individual units of work. Individual work unit pages may provide access to individual units of work. Managing information defining work unit pages may include determining, obtaining, and/or modifying information used to generate work unit pages. Managing information defining individual work unit pages may include providing information to the user interface component 110 to effectuate presentation of the work unit pages, and/or other information. In some implementations, individual work unit pages may include individual sets of interface elements displaying the values of one or more of the work unit parameters of the individual units of work.

In some implementations, environment state component 108 may be configured to manage information defining project pages corresponding to the individual projects. Individual project pages may provide access to individual projects. Managing information defining project pages may include determining, obtaining, and/or modifying information used to generate project pages. Managing information defining individual project pages may include providing information to the user interface component 110 to effectuate presentation of the project pages, and/or other information. In some implementations, individual project pages may include individual sets of interface elements displaying the values of one or more of the project parameters of the individual projects.

In some implementations, environment state component 108 may be configured to manage information defining business objective pages corresponding to the individual business objectives. Individual business objective pages may provide access to individual business objectives. Managing information defining business objective pages may include determining, obtaining, and/or modifying information used to generate business objective pages. Managing information defining individual business objective pages may include providing information to the user interface component 110 to effectuate presentation of the business objective pages, and/or other information. In some implementations, individual business objective pages may include individual sets of interface elements displaying the values of one or more of the objective parameters of the individual business objectives.

The user interface component 110 may be configured to effectuate presentation of instances of a user interface of the collaboration environment. The user interface may provide one or more views of the collaboration environment and/or provide other features and/or functionality. The one or more views may include one or more pages of the collaboration environment. In some implementations, an individual view of the collaboration environment may textually and/or graphically display information from one or more of a user record, a project record, an objective record, and/or other records. By way of non-limiting illustration, a view may display one or more of a work unit page, a project page, a business objective page, a queue of units of work, and/or other information.

The user interface component 110 may be configured to effectuate presentation of a user interface through which users input and/or upload digital assets representing sets of content. The individual sets of content may include one or more of recorded video content, recorded audio content, and/or other content.

In some implementations, digital assets that users may input may include one or more of video files, audio files, and/or other digital assets representing sets of content.

In some implementations, content of audio files may include recorded audio content and/or other content. The recorded audio content may include utterances of users and/or other sounds. User utterances may include speech, emotes, and/or other vocalizations. An individual utterance may include one or more of a spoken word, a statement, a vocal sound, and/or other considerations. Other sounds may include environmental noise and/or other sounds.

In some implementations, content of video files may include one or more of recorded video content, recorded audio content, and/or other content. In some implementations, the recorded video content may include visual content. The visual content may include one or more of individual images comprising frames of a video, sets of images comprising a series of frames, and/or other content. The video content may depict one or more of real-world users, real-world environment, digital content, and/or other content. In some implementations, video files may include time stamps associated with the recorded visual content and recorded audio content. The time stamps may provide a synchronization between the recorded video content and recorded audio content.

In some implementations, the sets of content represented in the digital assets may generally be unstructured content. "Unstructured" may mean that the content represented in the digital assets may be unusable by the collaboration environment unless and/or until it is structured in one form or another. The user interface may include one or more portions. A portion may include an input portion configured to receive user input of the digital assets. In some implementations, the input portion may be configured to receive user input through drag-and-drop input, file selection through a search and/or drop-down menu, and/or other input.

The user interface component 110 may obtain input information conveying user input into a user interface. In some implementations, the input information may define individual ones of the digital assets input by the users via the user interface. By way of non-limiting illustration, the input information may include the data included in uploaded files. By way of non-limiting illustration, the input information may define a first digital asset input into the user interface via the input portion by a first user and/or other users. The first digital asset may represent first recorded audio content and/or other content. The first recorded audio content may include a first set of utterances. The first set of utterances may include utterances by one or more users.

In some implementations, the content component 112 may be configured to, in response to obtaining the input information, generate transcription information and/or other information. The transcription information may characterize the audio and/or video content. The transcription information may include transcripts and/or other information. The transcripts may include text strings characterizing one or more of the utterances by users, physical gestures by users, facial expressions by users, physical movement by users, and/or other content. The transcripts may include text strings comprising one or more of the utterances by users, descriptions of the physical gestures by users, descriptions of the facial expressions by users, descriptions of the physical movement by users, and/or other content. By way of non-limiting illustration, first transcription information may be generated from the first recorded audio content and/or other content of the first digital asset. The first transcription information may include a first transcript comprising a first set of text strings characterizing the first set of utterances and/or other content.

In some implementations, generating transcription information from recorded audio may include performing speech processing on the recorded audio content and/or other processing. In some implementations, the speech processing may identify users, characterize user utterances in the audio content, and/or produce other output. By way of non-limiting illustration, the speech processing may determine user utterances (e.g., words and/or phrases spoken), identify users who are speaking, and/or provide other information. In some implementations, generating transcription information from recorded audio may include performing semantic natural language processing to determine the meaning of the utterances. In some implementations, the meaning of the utterances may be included in the transcripts. By way of non-limiting illustration, the meaning may be included with one or more of in-line descriptions, footnotes, as metadata accompanying the transcripts, and/or other considerations.

In some implementations, generating transcription information from recorded video content may include performing one or more of feature detection on the visual content to characterize features in the visual content, speech processing on audio content to characterize user utterances in the audio content, and/or other processing techniques. In some implementations, feature detection may characterize features in the visual content. By way of non-limiting illustration, techniques for feature detection may include one or more of computer vision, Speeded Up Robust Features (SURF), Scale-Invariant Feature Transform (SIFT), Oriented FAST and rotated BRIEF (ORB), Optical Character Recognition (OCR), facial recognition, and/or other techniques. In some implementations, the features and/or characterizations thereof may be included in the transcripts. By way of non-limiting illustration, descriptions of the features and/or characterizations thereof may be included with one or more of in-line descriptions, footnotes, as metadata accompanying the transcripts, and/or other considerations.

Content component 112 may be configured to generate transcription information in response to specific user input requesting the generation of the transcription information following the input of the digital assets. By way of non-limiting illustration, responsive to obtaining a request to generate transcription following the input of the first digital asset, content component 112 may be configured to generate the first transcription information.

In some implementations, the transcription information may include context information specifying context of the digital assets. The context may include one or more of an uploader of a digital asset (e.g., user who input the digital asset), a creator of a digital asset (e.g., a user who recorded the audio and/or video content), a page of the collaboration environment from which the user accessed the user interface to input of the digital assets, a time and/or date associated with the input of a digital asset, and/or other information.

The content component 112 may be configured to determine context information. By way of non-limiting illustration, the content component 112 may be configured to identify one or more of the users linked to a digital asset. The one or more users linked to the digital asset may include one or more of the creator of the digital asset, the uploader of the digital asset, and/or other users. The content component 112 may be configured to identify a time and/or date a digital asset was uploaded.

The content component 112 may be configured to obtain the user records for the users linked to the digital asset. In some implementations, an uploader of a digital asset may be identified. The user record of the uploader may be accessed and/or obtained to gather further information about the uploader. In some implementations, a creator of a digital asset may be identified. The creator may be identified based on identifying information included in the content of the digital asset and/or metadata associated with the digital asset. The user record of the creator may be accessed and/or obtained to gather further information about the creator.

In some implementations, a user may access the user interface to input a digital asset by navigating to the user interface from a page of the collaboration environment. The page may be associated with a record, referred to as a "source record" for the page. The source record may include one or more of a user record, a work unit record, a project record, an objective record, and/or other records.

The work creation component 114 may be configured to generate individual records based on transcription information and/or other information. In some implementations, an individual record may be generated by determining information describing the individual record as part of the environment state information. Determining work information may include specifying values for one or more parameters.

By way of non-limiting illustration, an individual work unit record may be generated by determining work information describing the individual work unit record as part of the environment state information. Determining work information may include specifying values for one or more work unit parameters. By way of non-limiting illustration, an individual project record may be generated by determining project information describing the individual project record as part of the environment state information. Determining project information may include specifying values for one or more project parameters. By way of non-limiting illustration, an individual objective record may be generated by determining objective information describing the individual objective record as part of the environment state information. Determining objective information may include specifying values for one or more objective parameters. It is noted that while one or more implementations described herein may refer to generation of work unit records, this is for illustrative purposes only and not to be considered limiting. Instead, those skilled in the art will appreciate that other types of records may be generated, including but not limited to project records, user records, objective records and/or other records.

A generated work unit record may include values determined based on context information of the transcription information, and/or other information. By way of non-limiting illustration, a work unit record may include one or more values determined on an identity of the uploaded. By way of non-limiting illustration, the uploader may be specified as one or more of an assignee of the work unit record, an assignor of the work unit record, a collaborator of the work unit record, a reviewer of the work unit record, and/or used to specify other values. In some implementations, a user linked to, and/or associated with, the uploader may be used to specify one or more values. By way of non-limiting illustration, a user having a subordinate role with respect to the uploader may be an assignee of the work unit record, a user having a superior role with respect to the uploader may be a reviewer of the work unit record, and/or other values may be specified.

In some implementations, a generated work unit record may include values determined based on an identity of a creator. By way of non-limiting illustration, the creator may be specified as one or more of an assignee of the work unit record, an assignor of the work unit record, a collaborator of the work unit record, a reviewer of the work unit record, and/or used to specify other values. In some implementations, a user linked to, and/or associated with, the creator may be used to specify one or more values. By way of non-limiting illustration, a user having a subordinate role with respect to the creator may be an assignee of the work unit record, a user having a superior role with respect to the creator may be a reviewer of the work unit record, and/or other values may be specified.

In some implementations, a generated work unit record may be included in a source record identified by the context information. In some implementations, a generated work unit record may be specified as being subordinate to the source record. In some implementations, a generated work unit record may be specified as being superior to the source record. In some implementations, a generated work unit record may be specified as being dependent on, or depending from, the source record. In some implementations, a generated work unit record may have one or more dates (e.g., due date, review date, and/or other dates) that are specified relative to one or more dates of the source record. By way of non-limiting illustration, the generated work unit record may have a due date that is specified as occurring a specified amount of days before and/or after a due date of the source record.

In some implementations, a generated work unit record may include values determined based on a time and/or date a digital asset was uploaded. By way of non-limiting illustration, a due date of the work unit record may be determined relative the time and/or date of the upload. By way of non-limiting illustration, a due date may be specified as being given period of time following the time and/or date of upload.

In some implementations, work creation component 114 may be configured to train and/or utilize a machine learning model to generate individual records based on transcription information and/or other information. In some implementations, the machine learning model may utilize one or more of an artificial neural network, naïve bayes classifier algorithm, k means clustering algorithm, support vector machine algorithm, linear regression, logistic regression, decision trees, random forest, nearest neighbors, and/or other approaches. The work creation component 114 may utilize training techniques such as deep learning. The work creation component 114 may utilize training techniques such as one or more of supervised learning, semi-supervised learning, unsupervised learning, reinforcement learning, and/or other techniques.

In supervised learning, the model may be provided with known training dataset that includes desired inputs and outputs, and the model may be configured to find a method to determine how to arrive at those outputs based on the inputs. The model may identify patterns in data, learn from observations, and make predictions. The model may make predictions and may be corrected or validated by an operator—this process may continue until the model achieves a high level of accuracy/performance. Supervised learning may utilize approaches including one or more of classification, regression, and/or forecasting.

Semi-supervised learning may be similar to supervised learning, but instead uses both labelled and unlabeled data. Labelled data may comprise information that has meaningful tags so that the model can understand the data, while unlabeled data may lack that information. By using this combination, the machine learning model may learn to label unlabeled data.

For unsupervised learning, the machine learning model may study data to identify patterns. There may be no answer key or human operator to provide instruction. Instead, the model may determine the correlations and relationships by analyzing available data (see, e.g., text corpus described below). In an unsupervised learning process, the machine learning model may be left to interpret large data sets and address that data accordingly. The model tries to organize that data in some way to describe its structure. This might mean grouping the data into clusters or arranging it in a way that looks more organized. Unsupervised learning may use techniques such as clustering and/or dimension reduction.

Reinforcement learning may focus on regimented learning processes, where the machine learning model may be provided with a set of actions, parameters, and/or end values. By defining the rules, the machine learning model then tries to explore different options and possibilities, monitoring and evaluating each result to determine which one is optimal. Reinforcement learning teaches the model trial and error. The model may learn from past experiences and begins to adapt its approach in response to the situation to achieve the best possible result.

By way of non-limiting illustration, work creation component 114 may be configured to train a machine learning model on input/output pairs to generate a trained machine learning model configured to generate individual records.

The input/output pairs including training input information and training output information. The training input information and/or training output information may be derived from a text corpus. The text corpus may comprise the text making up the pages (e.g., work unit pages, project pages, etc.) for existing records of the collaboration environment. The training output information may include the values of the parameters of the existing records and/or the organization therefore as stored by the system 100. By way of non-limiting illustration, training input information for an individual input/output pair including the text making up an individual work unit page for an individual existing one of the work unit records; and the training output information for the individual input/output pair including the values of the work unit parameters of the individual existing one of the work unit records. By way of non-limiting illustration, training input information for an individual input/output pair including the text making up an individual project page for an individual existing one of the project records; and the training output information for the individual input/output pair including the values of the project parameters of the individual existing one of the project records.

The work creation component 114 may be configured to obtain and/or derive the text corpus comprising the text making up the pages (e.g., work unit pages, project pages, etc.) for existing records of the collaboration environment. The work creation component 114 may be configured to obtain and/or access the existing records. The work creation component 114 may be configured to compile the text from the text corpus and the values from the existing records into the input/output pairs. The work creation component 114 may be configured to train the machine learning model based on multiple sets of input/output pairs to generate the trained machine learning model. The training process may continue until the model achieves a desired level of accuracy on the training data. The work creation component 114 may be configured to store the trained machine learning model. By using the existing records and text of pages, the trained machine learning model may be trained in a way that already reflects how users create records. The text corpus provides insight on how users actually define elements of a record (e.g., by the words they use). By using this text in relation to how the records are ultimately defined and stored by the system 100, the trained machine learning model may be well adapted to generate records from the transcripts.

In some implementations, the text corpus may comprise text derived from a particular set of one or more parameters of the existing records. By way of non-limiting illustration, the text corpus may be focused the "name" (or "title") of the record as it appears on a page. By way of non-limiting illustration, the text corpus may be focused the "description" of the record as it appears on a page. The text corpus may be focused on other particular parameters.

In some implementations, the text corpus may comprise text making up the pages for particular types of records of the collaboration environment. The text corpus may comprise text making up the pages for work unit records so that the trained machine learning model may be particularly adapted to generating work unit records. The text corpus may comprise text making up the pages for project records so that the trained machine learning model may be particularly adapted to generating project records. The text corpus may comprise text making up the pages for objective records so that the trained machine learning model may be particularly adapted to generating objective records. The text corpus may comprise text making up the pages for user records so that the trained machine learning model may be particularly adapted to generating user records.

In some implementations, a text corpus may be derived from existing records of some or all users of the system 100 and used to train a machine learning model that applies to some or all users. In some implementations, a text corpus may be derived from a set of existing records specific to a set of users and used to train a machine learning model that is specific to the set of users. By way of non-limiting illustration, a set of users may be associated with a given business entity such that the business entity may have an account within system 100 which provides access to the set of users (e.g., it's employees). The text corpus may be derived from the set of existing records specific to the set of users such that the resulting trained machine learning model may be particularly adapted to the style, grammar, preferences, lexicography, and/or other attributes particular to the set of users. By adapting the machine learning model to a specific set of users, the output from the training machine learning model may be more accurate and/or relevant for that set of users.

By way of non-limiting illustration, the machine learning model may be further trained to identify triggers from the text corpus. Triggers may refer to words, phrases, and/or other content that may trigger generation of one or more records. Triggers may refer to words, phrases, and/or other content that may trigger specification of one or more values of one or more parameters of the records. In some implementations, triggers may be user-specific, team-specific, and/or system-wide. In some implementations, one or more words and/or phrases may be identified from the text corpus as trigger words and/or phrases. Trigger phrases and/or words may include words and/or phrases conveying one or more of action items or tasks to be completed, intent, desire, wants, and/or other information. In some implementations, the trigger phrases and/or words may include words accompanied by one or more of will you, can you, could you, please, by a given date, before the given date, we need, I need, I want, would be grateful if, you could, and/or other phrases and/or words.

The work creation component 114 may be configured to provide the transcription information and/or other information as input into the trained machine-learning model. The trained machine-learning model being configured to provide output including new ones of the records. By way of non-limiting illustration, the input into the trained machine-learning model may include the first transcription information and/or other information.

The work creation component 114 may be configured to obtain the output from the trained machine-learning model. The output including new ones of the records may include specification of one or more values of one or more parameters. In some implementations, individual values may include individual text and/or text strings from the transcripts. In some implementations, individual values may include individual meanings of the utterances. In some implementations, individual values may include individual features and/or characterizations thereof from the video.

By way of non-limiting illustration, the output defining a new work unit record may include one or more values of one or more work unit parameters. By way of non-limiting illustration, the output may include a first work unit record based on the input of the first transcription information and/or other information. The output may include the first work unit record by virtue of including a first set of values for the work unit parameters for the first work unit record. In some implementations, the first set of values may include one or more of a first value for a title parameter, a second value of a work assignment parameter, a third value for a due date parameter user, and/or other values. In some implementations, individual ones of the values in the first set of values include individual text and/or text strings in the first set of text strings. In some implementations, individual ones of the values in the first set of values include individual meanings of the utterances.

In some implementations, the environment state component 108 may be configured to, in response to the generating new records, generate and/or store resource information in the new records. The resource information may include one or more of copies of the digital assets, resource identifiers that facilitate access to the digital assets, and/or other information. A resource identifier may include one or more of a pointer, a hyperlink, and/or other identifier configured to provide access to an individual record (e.g., a source record and/or other record). In some implementations, resource information may include timestamp information that identifies one or more points in time within recorded content from which records were generated. For example, transcripts may have content (e.g., words and/or phrases) timestamped in accordance with when they appear in recorded content. When the content results in a record being generated, the timestamp of that content may be recorded and included in the resource information.

Storing the resource information in the individual records may cause individual resource identifiers and/or timestamp information to be presented in individual pages of the individual records. By presenting timestamp information, users will know where the record originated from, and can quickly refer back to it for reference if needed. For example, a page for a record may include a link to recorded content and a notification of a point in time within the recorded content that drove the generation of the record (e.g., "Minute 34 of the Audio recording X").

In some implementations, environment state information may be updated as users continue to interact with the collaboration environment via the user interfaces over time. The environment state component 108 may store and/or archive the environment state information periodically and/or based on user request to archive. In some implementations, the environment state component 108 may store historical environment state information specifying historical user information, historical work information, historical project information, historical objective information, user interaction history, and/or other information.

In some implementations, the trained machine learning model may be updated/refined based on user corrections and/or validations to the generated records. For example, a user accessing a page for a record generated based on recorded content may be prompted to correct and/or validate information appearing on the page. For example, the user may refine/change a title, description, and/or other information. The corrections and/or validations may cause the model to adapt and/or learn so that it may achieve a high level of accuracy/performance. In some implementations, a user may be guided through a process walking the user from the recorded content to the page for the generated record. Prompts or notifications may be presented during the walkthrough which represent decision(s) made by the machine learning model, where the user can then correct and/or validate the decision(s). This may provide a user-friendly way to validate what was generated and may be an expansion of the training of the model itself.

Figure 3:
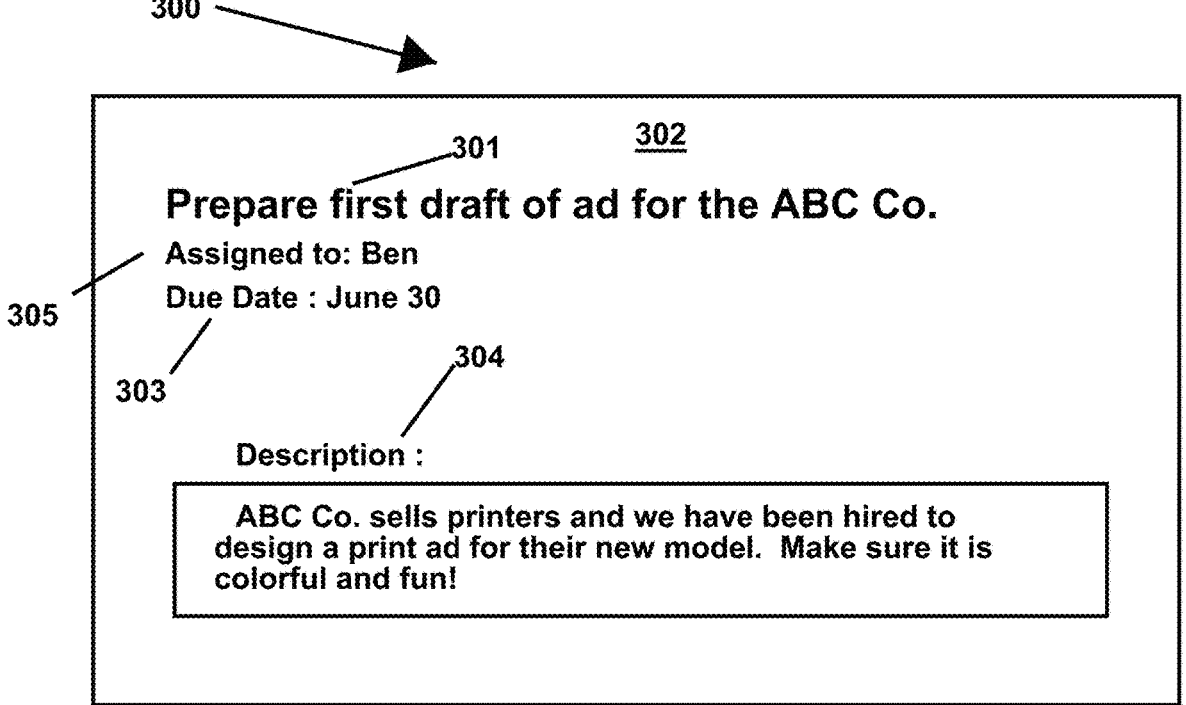
FIG. 3 illustrates a user interface, in accordance with one or more implementations.

FIG. 3 illustrates a user interface 300 of a collaboration environment, in accordance with one or more implementations. The user interface 300 may include a view of a collaboration environment. In particular, the user interface 300 may comprise a work unit page 302 for a unit of work 301 from text may be derived as part of a text corpus for training a machine learning model. The user interface 300 may display values of one or more work unit parameters, and/or other information. By way of non-limiting illustration, a user interface element 301 may display a title of the unit of work 301. A user interface element 303 may display a due date of unit of work 301. A user interface element 305 may display an assignee of unit of work 301. A user interface element 304 may display a description of the unit of work 301.

Figure 4:
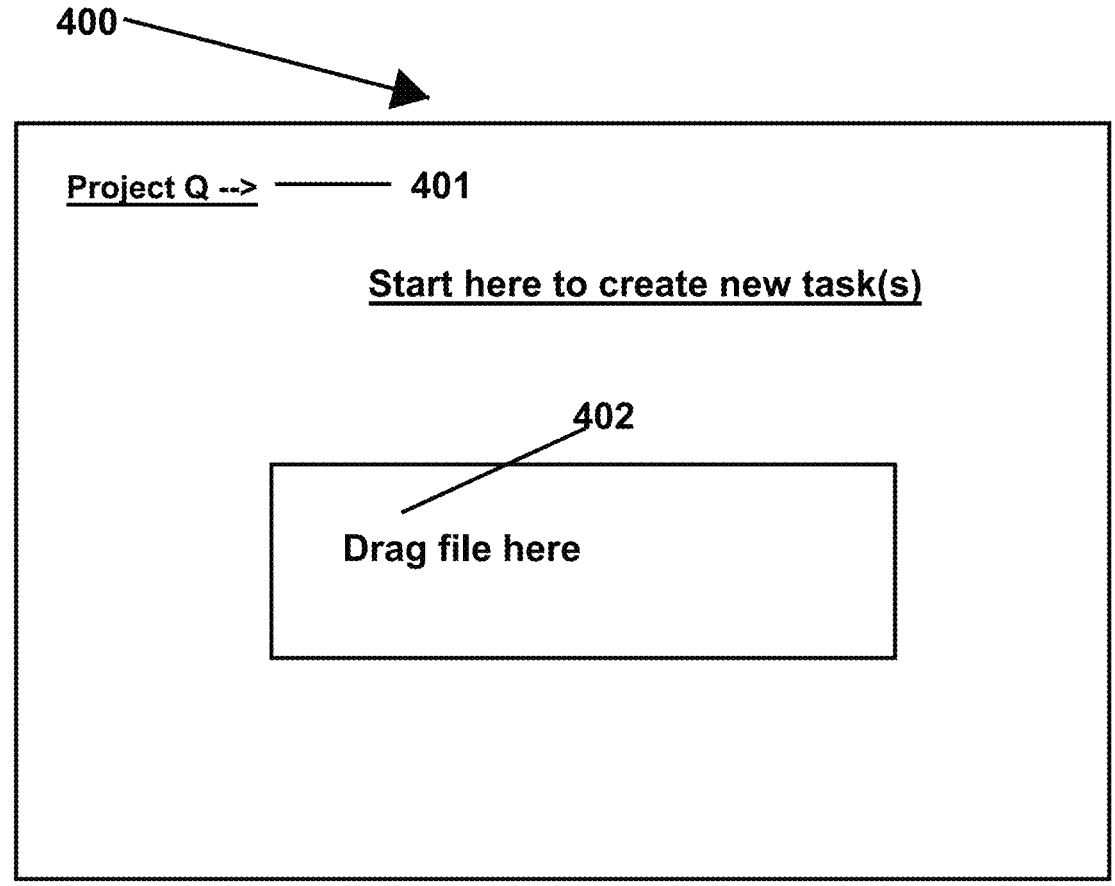
FIG. 4 illustrates a user interface, in accordance with one or more implementations.

FIG. 4 illustrates a user interface 400, in accordance with one or more implementations. The user interface 400 may be a user interface through which users upload digital assets to generate records. The user interface 400 may include an input portion 402 configured to receive user input of individual digital assets. The user interface 400 may include a user interface element 401 that provides access to a page of the collaboration from which the user interface 400 was accessed. By way of non-limiting illustration, based on requesting to upload a digital asset within a project page for "Project Q", user interface 400 may be presented. The project record for Project Q may act as a source record for the subsequent creation of one or more records.

A user may input a digital asset into input portion 402, for example, a file representing recorded audio and/or video content (e.g., from a recorded meeting). Processing of the file may generate a transcript of the recording. By way of non-limiting illustration, the transcript may characterize user utterance that identify needs and/or desires of a speaker, identify a person to carry out work, identify work to be done, and/or other characterizations.

Figure 5:
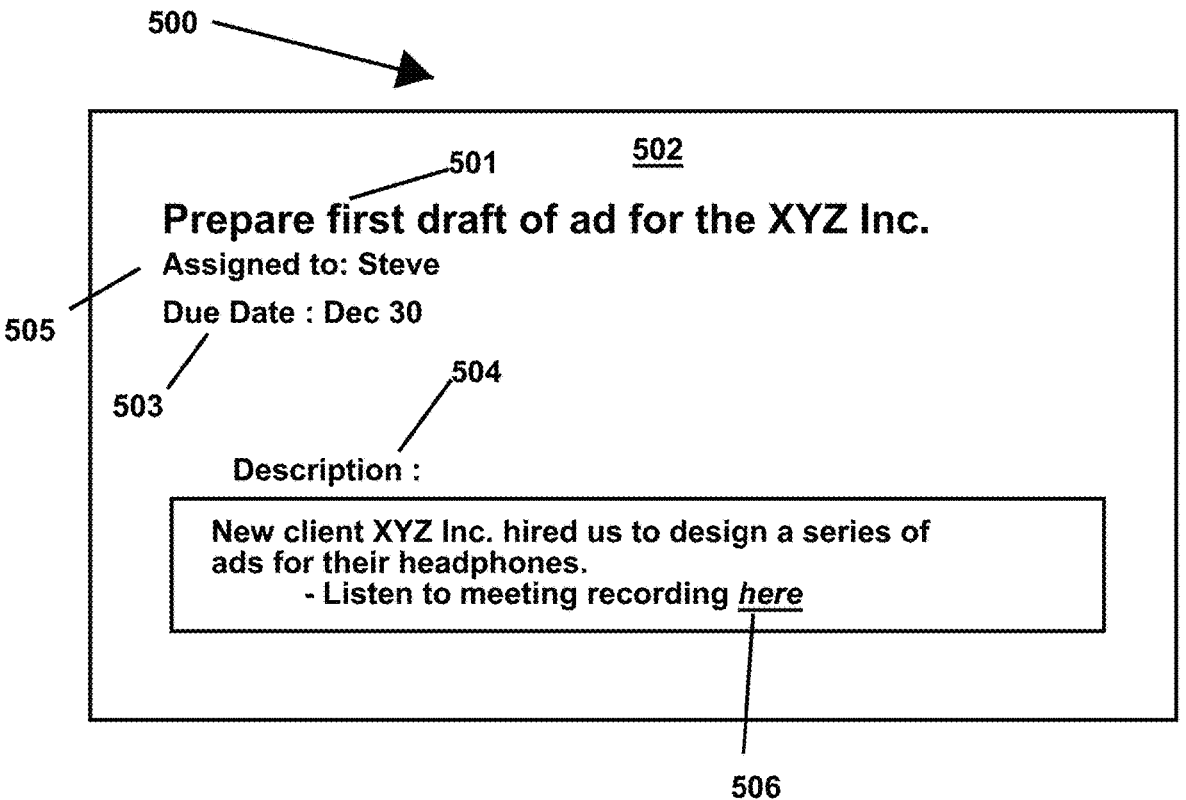
FIG. 5 illustrates a user interface, in accordance with one or more implementations.

FIG. 5 illustrates a user interface 500 of a collaboration environment, in accordance with one or more implementations. The user interface 500 may include a view of a collaboration environment. In particular, the user interface 500 may comprise a work unit page 502 for a unit of work 501 obtained from output of a trained machine learning model that has been provided a transcript as input. The user interface 500 may display values of one or more work unit parameters, and/or other information. One or more of the values may reflect information learned from existing records and/or pages from the records. By way of non-limiting illustration, a user interface element 501 may display a title of the unit of work 501. A user interface element 503 may display a due date of unit of work 501. A user interface element 505 may display an assignee of unit of work 501. A user interface element 504 may display a description of the unit of work 501. The title, for example, may have a format or flow that follows what was learned from work unit page 302 in FIG. 3. The work unit page 502 may include a link 504 to the digital asset from which the unit of work was generated, which may be stored in the new work unit record and/or other record following upload.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112 and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
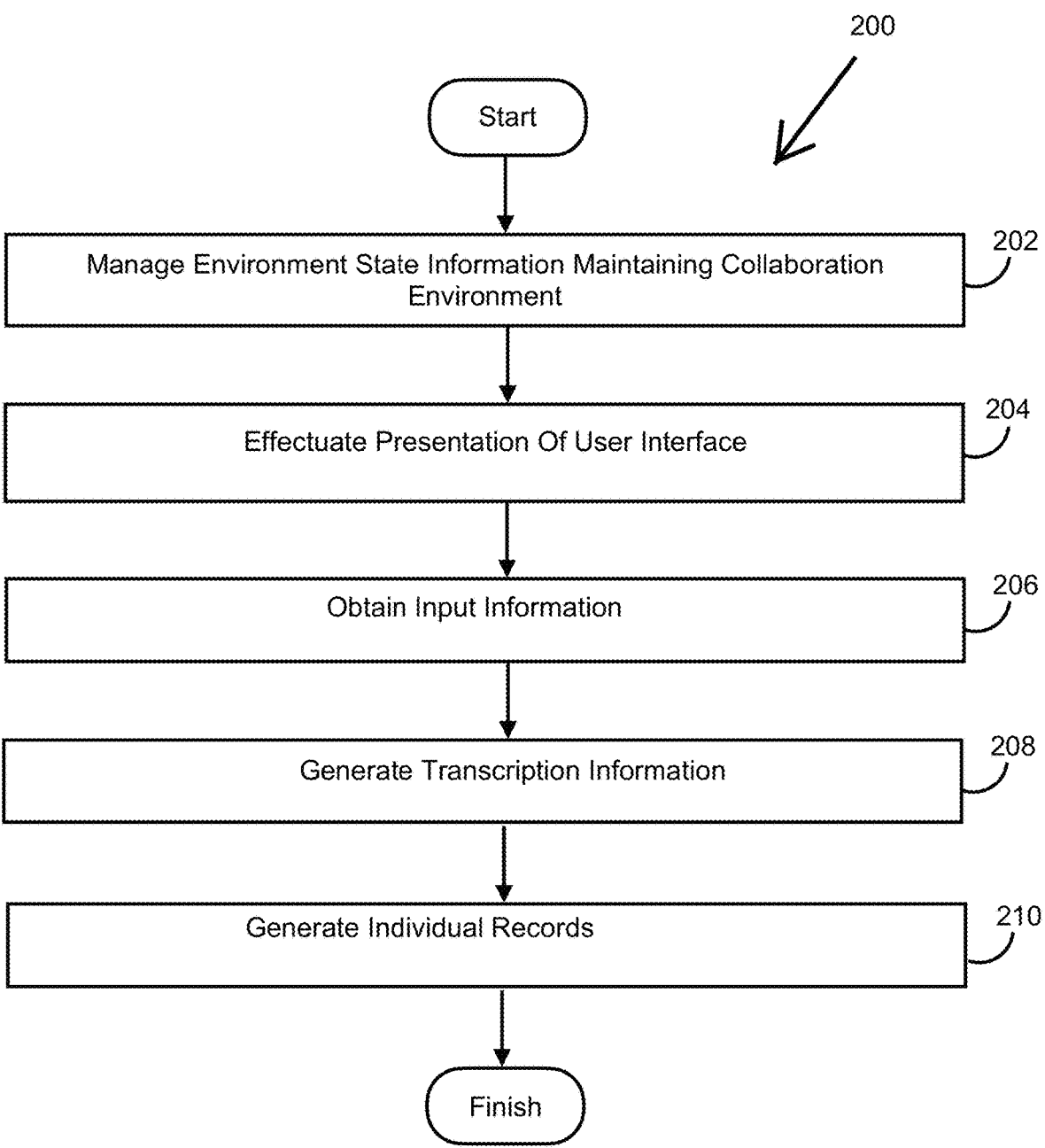
FIG. 2 illustrates a method to generate records within a collaboration environment, in accordance with one or more implementations.

FIG. 2 illustrates a method 200 to generate records within a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may include one or more records. The one or more records may include work unit records and/or other records. The work unit records may include work information and/or other information. The work information may characterize units of work created, managed, and/or assigned to within the collaboration environment to the users who are expected to accomplish one or more actions to complete the units of work. The work information may comprise values of work unit parameters. Operation 202 may be performed by one or more hardware processors configured by machine-readable instructions including a component that is the same as or similar to environment state component 108, in accordance with one or more implementations.

An operation 204 may effectuate presentation of a user interface through which users upload digital assets representing video and/or audio content. The video and/or audio content may include human utterances and/or other content. The user interface may include one or more portions. The one or more portions may include an input portion. The input portion may be configured to receive user input of individual ones of the digital assets. Operation 204 may be performed by one or more hardware processors configured by machine-readable instructions including a component that is the same as or similar to user interface component 110, in accordance with one or more implementations.

An operation 206 may obtain input information defining the digital assets input via the user interface. The input information may define a first digital asset input into the user interface via the input portion. The first digital asset may include first recorded audio and/or video content including a first set of utterances. Operation 206 may be performed by one or more hardware processors configured by machine-readable instructions including a component that is the same as or similar to user interface component 110, in accordance with one or more implementations.

An operation 208 may, in response to obtaining the input information, generate transcription information and/or other information. The transcription information may characterize the audio and/or video content. The transcription information may include transcripts and/or other information. The transcripts may include text strings characterizing one or more of the utterances, physical gestures, facial expressions, physical movement, and/or other content. By way of non-limiting illustration, first transcription information may be generated from the first recorded audio and/or video content of the first digital asset. The first transcription information may include a first transcript comprising a first set of text strings characterizing the first set of utterances and/or other content. Operation 208 may be performed by one or more hardware processors configured by machine-readable instructions including a component that is the same as or similar to content component 112, in accordance with one or more implementations.

An operation 210 may generate individual records by providing transcription information as input into a trained machine-learning model. The trained machine-learning model may be configured to provide output based on input (s). The output may include new records. The output may include definitions of the new ones of the records based on the transcripts and/or other content. The output may define the new ones of the records by including one or more values of one or more parameters of the new ones of the new one so the records. By way of non-limiting illustration, the input into the trained machine-learning model may include the first transcription information, and the output may include a first work unit record. Operation 210 may be performed by one or more hardware processors configured by machine-readable instructions including a component that is the same as or similar to work creation component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to generate work unit records within a collaboration environment, the system comprising:
one or more physical processors configured by machine-readable instructions to:
manage, by a server, electronically stored environment state information maintaining a collaboration environment, the collaboration environment being configured to facilitate interaction by users with the collaboration environment, the server communicating with remotely located client computing platforms associated with the users over one or more network connections to provide access to the collaboration environment through instances of a graphical user interface, the environment state information including work unit records, the work unit records including work information characterizing units of work created within the collaboration environment, managed by the users within the collaboration environment, and/or assigned within the collaboration environment to the users who are expected to accomplish one or more actions to complete the units of work;

establish the one or more network connections between the server and the remotely located client computing platforms;

obtain, by the server, input information defining a digital asset for recorded audio content including a set of utterances;

generate, by the server, a transcript of the set of utterances;

train, by the server, a machine-learning model based on a text corpus to generate a trained machine-learning model, the text corpus comprising user-generated text that makes up pages of the graphical user interface of the collaboration environment through which the users access the work unit records, the trained machine-learning model being configured to provide output including new work information defining new work unit records;

provide, by the server, the transcript as input into the trained machine-learning model;

obtain, by the server, first output of the trained machine-learning model, the first output including first new work information of a first new work unit record based on the input of the transcript;

generate, by the server, user interface information defining a new page of the graphical user interface of the collaboration environment through which the users access the first new work information of the first new work unit record;

effectuate communication of the user interface information from the server to a remotely located client computing platform over the one or more network connections to cause the remotely located client computing platform to present the new page through which the first new work information is accessed;

obtain, by the server, further input information conveying user input into the new page that corrects and/or validates the first new work information appearing on the new page; and refine, by the server, the trained machine-learning model based on whether the first new work information has been corrected and/or validated through the user input into the new page.

2. The system of claim 1, wherein the digital asset includes a video file comprising the recorded audio content and visual content.

3. The system of claim 1, wherein generating the transcript is based on performing speech processing on the recorded audio content and semantic natural language processing to determine meaning of individual utterances, wherein the meaning of the individual utterances is included in the transcript.

4. The system of claim 1, wherein the one or more physical processors are further configured by the machine-readable instructions to:

compile, by the server, the text corpus and the work information of the work unit records into input/output training pairs to train the machine-learning model.

5. The system of claim 1, wherein the one or more physical processors are further configured by the machine-readable instructions to:

provide context information as part of the input into the trained machine-learning model, the context information specifying context of the digital asset, the context identifying one or more users linked to the digital asset.

6. The system of claim 5, wherein a user linked to the digital asset includes a creator of the digital asset or an uploader of the digital asset.

7. The system of claim 1, wherein the first new work information includes a value for a work unit parameter of the first new work unit record.

8. The system of claim 7, wherein the work unit parameter is a title parameter, a work assignment parameter, or a due date parameter user.

9. The system of claim 7, wherein the value is a text string within the transcript.

10. The system of claim 9, wherein the value further includes a meaning of the text string.

11. A method to generate work unit records within a collaboration environment, the method comprising:

managing, by a server, electronically stored environment state information maintaining a collaboration environment, the collaboration environment being configured to facilitate interaction by users with the collaboration environment, the server communicating with remotely located client computing platforms associated with the users over one or more network connections to provide access to the collaboration environment through instances of a graphical user interface, the environment state information including work unit records, the work unit records including work information characterizing units of work created within the collaboration environment, managed by the users within the collaboration environment, and/or assigned within the collaboration environment to the users who are expected to accomplish one or more actions to complete the units of work;

establishing the one or more network connections between the server and the remotely located client computing platforms;

obtaining, by the server, input information defining a digital asset for recorded audio content including a set of utterances;

generating, by the server, a transcript of the set of utterances;

training, by the server, a machine-learning model based on a text corpus to generate a trained machine-learning model, the text corpus comprising user-generated text that makes up pages of the graphical user interface of the collaboration environment through which the users access the work unit records, the trained machine-learning model being configured to provide output including new work information defining new work unit records;

providing, by the server, the transcript as input into the trained machine-learning model;

obtaining, by the server, first output of the trained machine-learning model, the first output including first new work information of a first new work unit record based on the input of the transcript;

generating, by the server, user interface information defining a new page of the graphical user interface of the collaboration environment through which the users access the first new work information of the first new work unit record;

effectuating communication of the user interface information from the server to a remotely located client computing platform over the one or more network connections to cause the remotely located client computing platform to present the new page through which the first new work information is accessed;

obtaining, by the server, further input information conveying user input into the new page that corrects and/or validates the first new work information appearing on the new page; and refining, by the server, the trained machine-learning model based on whether the first new work information has been corrected and/or validated through the user input into the new page.

12. The method of claim 11, wherein the digital asset includes a video file comprising the recorded audio content and visual content.

13. The method of claim 11, wherein the generating the transcript is based on performing speech processing on the recorded audio content and semantic natural language processing to determine meaning of individual utterances, wherein the meaning of the individual utterances is included in the transcript.

14. The method of claim 11, further comprising:

compiling, by the server, the text corpus and the work information of the work unit records into input/output training pairs to train the machine-learning model.

15. The method of claim 11, further comprising:

providing context information as part of the input into the trained machine-learning model, the context information specifying context of the digital asset, the context identifying one or more users linked to the digital asset.

16. The method of claim 15, wherein a user linked to the digital asset includes a creator of the digital asset or an uploader of the digital asset.

17. The method of claim 11, wherein the first new work information includes a value for a work unit parameter of the first new work unit record.

18. The method of claim 17, wherein the work unit parameter is a title parameter, a work assignment parameter, or a due date parameter user.

19. The method of claim 17, wherein the value is a text string within the transcript.

20. The method of claim 19, wherein the value further includes a meaning of the text string.

* * * * *